(12) United States Patent
Elyasi (10) Patent No.: US 8,379,761 B2
(45) Date of Patent: Feb. 19, 2013

(54) SMOOTH MODULATION SWITCHING

(75) Inventor: Sattar Elyasi, San Jose, CA (US)

(73) Assignee: Altobridge Limited (IE)

( * ) Notice: Subject to any disclaimer, the term of this patent is extended or adjusted under 35 U.S.C. 154(b) by 894 days.

(21) Appl. No.: 12/422,560

(22) Filed: Apr. 13, 2009

(65) Prior Publication Data

US 2010/0260290 A1 Oct. 14, 2010

(51) Int. Cl.
*H03C 3/00* (2006.01)

(52) U.S. Cl. ........ 375/302; 375/260; 375/308; 375/297; 375/295

(58) Field of Classification Search ............. 375/302, 375/260, 308, 297, 279, 295, 296, 219; 455/456
See application file for complete search history.

(56) References Cited

U.S. PATENT DOCUMENTS

| | | | |
|---|---|---|---|
| 4,183,054 A | 1/1980 | Patisaul et al. | |
| 4,611,323 A | 9/1986 | Hessenmiiller | |
| 4,628,501 A | 12/1986 | Loscoe | |
| 4,654,843 A | 3/1987 | Roza et al. | |
| 4,691,292 A | 9/1987 | Rothweiler | |
| 4,999,831 A | 3/1991 | Grace | |
| 5,193,109 A | 3/1993 | Chien-Yeh Lee | |
| 5,243,598 A | 9/1993 | Lee | |
| 5,321,849 A | 6/1994 | Lemson | |
| 5,339,184 A | 8/1994 | Tang | |
| 7,016,429 B1 * | 3/2006 | Dogan et al. | 375/279 |
| 7,817,730 B2 * | 10/2010 | Chow et al. | 375/260 |
| 2002/0004400 A1 * | 1/2002 | Fischer et al. | 455/456 |
| 2005/0281353 A1 * | 12/2005 | Huang et al. | 375/295 |
| 2005/0286653 A1 * | 12/2005 | Lai et al. | 375/308 |
| 2007/0025468 A1 * | 2/2007 | Li | 375/308 |
| 2007/0297360 A1 * | 12/2007 | Joachim et al. | 370/329 |

(Continued)

FOREIGN PATENT DOCUMENTS

| | | |
|---|---|---|
| EP | 0391597 | 10/1990 |
| WO | 9115927 | 10/1991 |

(Continued)

OTHER PUBLICATIONS

Grace, Martin K., "Synchronous Quantized Subcarrier Multiplexing for Transport of Video, Voice and Data", "IEEE Journal on Selected Areas in Communications", Sep. 1990, pp. 1351-1358, vol. 8, No. 7, Publisher: IEEE.

(Continued)

*Primary Examiner* — Shuwang Liu
*Assistant Examiner* — Helene Tayong
(74) *Attorney, Agent, or Firm* — Bryan Cave LLP (57) ABSTRACT

A transmitter comprises a channel encoder to encode data bits; a modulator to modulate the encoded data bits, wherein the modulator selects one of a first modulation scheme and a second modulation scheme for each of a plurality of time slots; wherein, for each time slot, the channel encoder: includes a prefix and a suffix at the beginning and end, respectively, of the encoded data bits corresponding to the respective time slot, the prefix and the suffix being selected based on the selected modulation scheme for the respective time slot; and passes the prefix, the encoded data bits, and the suffix to the modulator; wherein, for each time slot, the modulator: modulates the prefix, the encoded data bits, and the suffix received from the channel encoder according to the selected modulation scheme for the respective time slot; and applies a window function to the prefix and the suffix.

26 Claims, 5 Drawing Sheets

U.S. PATENT DOCUMENTS

| | | | |
|---|---|---|---|
| 2008/0187072 A1* | 8/2008 | Schell et al. | 375/296 |
| 2008/0253349 A1* | 10/2008 | Yu | 370/345 |
| 2009/0122844 A1* | 5/2009 | Wenzel et al. | 375/219 |
| 2009/0154598 A1* | 6/2009 | Jensen | 375/308 |

FOREIGN PATENT DOCUMENTS

| | | |
|---|---|---|
| WO | WO0106724 | 1/2001 |

OTHER PUBLICATIONS

Harvey et al., "Cordless Communications Utilising Radio Over Fibre Techniques for the Local Loop", "IEEE International Conference on Communications", Jun. 1991, pp. 1171-1175, Publisher: IEEE.

\* cited by examiner

SMOOTH MODULATION SWITCHING

BACKGROUND

In some communication systems, inter-symbol interference may occur when switching between modulation schemes. For example, in a Global System for Mobile communication (GSM) network implementing Enhanced Data rate for GSM Evolution (EDGE), two modulation schemes are defined and supported in the base stations and wireless devices. The transmitters in the base stations and the wireless devices need to switch from one modulation scheme to the other whenever there is a need to do so. For example, a first time slot may use Gaussian Minimum Shift Keying (GMSK) modulation and a second time slot may use GMSK or 8 phase shift keying (PSK) modulation and vice versa. The transition from GMSK to 8PSK and vice versa should be smooth to reduce the creation of frequency spikes due to switching. In other words, phase discontinuity when the modulation switching occurs should be minimized to reduce the creation of high frequency interference.

SUMMARY

In one embodiment, a transmitter that transmits modulated signals over a communication link is provided. The transmitter comprises a channel encoder to encode data bits; a modulator to modulate the encoded data bits, wherein the modulator selects one of a first modulation scheme and a second modulation scheme for each of a plurality of time slots; wherein, for each time slot, the channel encoder: includes a prefix and a suffix at the beginning and end, respectively, of the encoded data bits corresponding to the respective time slot, the prefix and the suffix being selected based on the selected modulation scheme for the respective time slot; and passes the prefix, the encoded data bits, and the suffix to the modulator; wherein, for each time slot, the modulator: modulates the prefix, the encoded data bits, and the suffix received from the channel encoder according to the selected modulation scheme for the respective time slot; and applies a window function to the prefix and the suffix.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments. Like reference numbers and designations in the various drawings indicate like elements.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures or the specification is not to be construed as limiting the order in which the individual steps may be performed. The following detailed description is, therefore, not to be taken in a limiting sense.

Figure 1:
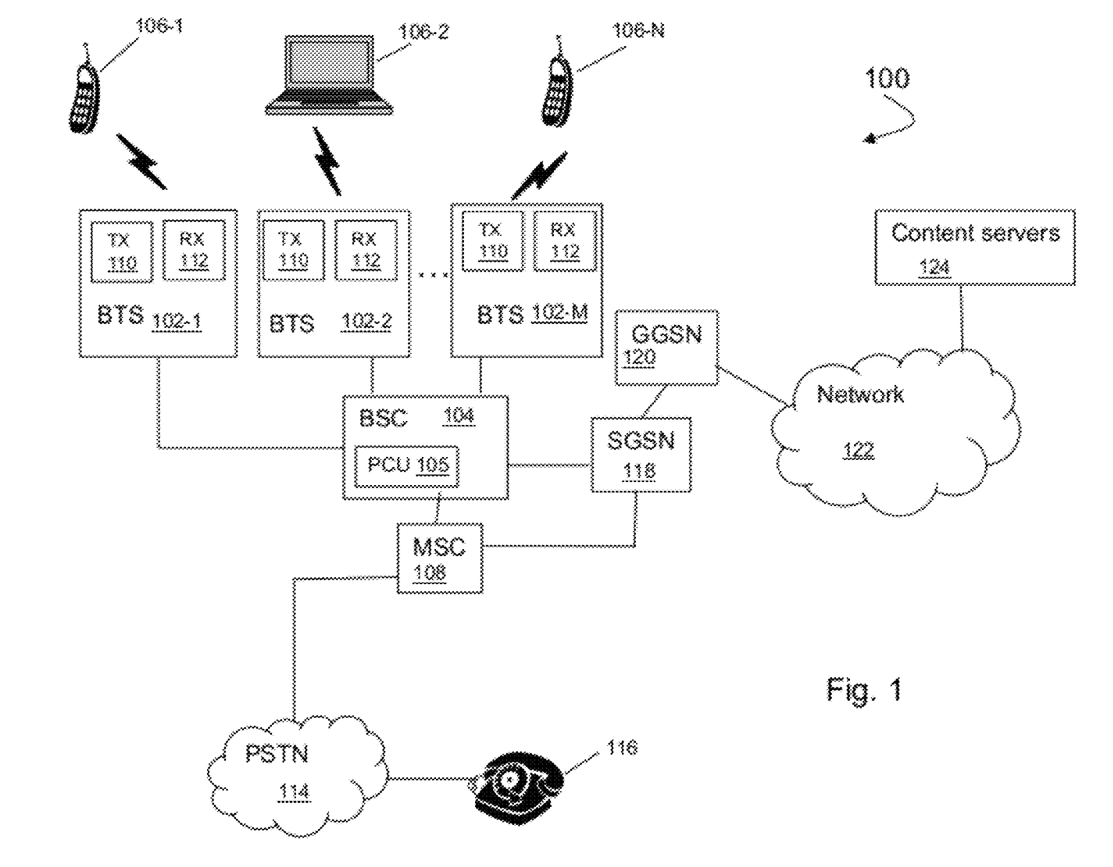
FIG. 1 is a high level block diagram of one embodiment of a wireless communication system.

FIG. 1 is a high level block diagram of a wireless communication network 100. In particular, the exemplary implementation shown in FIG. 1 depicts a Global System for Mobile communications (GSM) network. GSM network 100 is used for cellular wireless networks and is typically used with licensed radio frequency spectrum. However, it is to be understood that other communication network standards can be used in other implementations of network 100. Network 100 comprises a plurality of base station transceivers (BTS) 102-1 ... 102-M, which are controlled by a Base Station Controller (BSC) 104. BTS 102-1 ... 102-M each comprise a transmitter 110 and a receiver 112 to transmit and receive wireless signals from one or more wireless devices 106-1 ... 106-N. Exemplary wireless devices include mobile phones, personal digital assistants (PDA), laptops, and any other device configured to connect to network 100. Each of wireless devices 106-1 ... 106-N also includes a transmitter and receiver, not shown, to transmit and receive wireless signals. Although the transmitter 110 and receiver 112 are shown as separate devices in FIG. 1, in some implementations, the receiver 112 and transmitter 110 are integrated into a single device (sometimes referred to as a "transceiver"). An exemplary transmitter 110 and an exemplary receiver 112 are shown and described in more detail in FIG. 2.

Wireless devices 106-1 ... 106-N can make a voice call to telephone 116 via Mobile Switching Center (MSC) 108 which provides circuit-switching to a public switched telephone network (PSTN) 114. In addition, wireless devices 106-1 ... 106-N can access non-real-time data, such as web pages, email, etc., stored on content servers 124, over GSM network 100. In particular, BSC 104 includes a packet control unit (PCU) function 105 that processes packet data received from wireless devices 106-1 ... 106-N. Although PCU 105 is implemented as part of BSC 104 in this embodiment, it is to be understood that in other embodiments PCU 105 can be implemented as a separate device. PCU 105 passes the packets to a serving general packet radio services (GPRS) support node (SGSN) 118. SGSN 118 uses stored location information to route data packets to and from wireless devices 106-1 ... 106-N. Gateway GPRS support node (GGSN) 120 provides an interface to network 122. Network 122 can be the internet, a local area network (LAN), or a wide area network (WAN), etc. Data from content servers 124 is sent over network 122 and provided to wireless devices 106-1 ... 106-N via GGSN 120, SGSN 118, and BSC 104.

Figure 2:
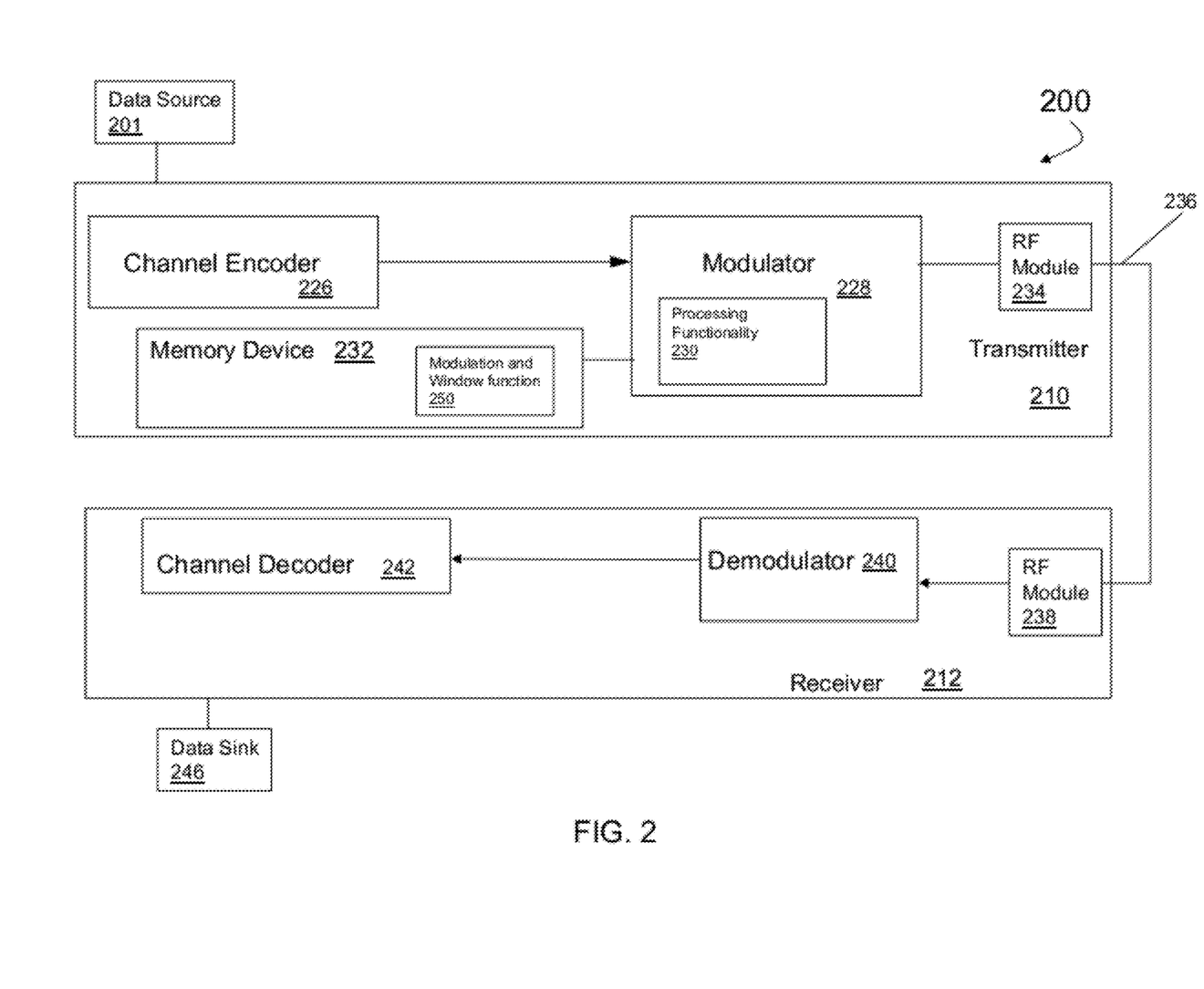
FIG. 2 is a block diagram of one embodiment of communication devices.

FIG. 2 is a block diagram of an exemplary transmitter 210 and receiver 212. The transmitter 210 comprises a channel encoder 226 and a modulator 228. The channel encoder 226 encodes data bits received from a data source 201 using techniques known to one of skill in the art. The data source 201 includes higher layer functionality that provides data for transmission such as, but not limited to, email, multimedia capture (image, video, sound), and Voice over Internet Protocol (VOIP). In addition, after modulating the encoded data bits, the transmitter 210 transmits the encoded data bits in time slots. For example, in this exemplary implementation of a GSM system, transmitter 210 transmits 148 bits in each time slot and 8 time slots per time division multiple access (TDMA) frame. The channel encoder 226 pre-pends a prefix at the beginning of data corresponding to a time slot and appends a suffix at the end of the data corresponding to the time slot. The prefix and suffix are chosen based on the modulation scheme selected for that corresponding time slot.

In particular, the encoded data bits for each time slot are modulated according to one of a plurality of modulation schemes. In this exemplary embodiment, two modulation schemes are used. For example, the modulation schemes can include, but are not limited to, a phase-shift keying (PSK) modulation scheme, such as a Global System for Mobile communications (GSM) 8-PSK modulation scheme or a Gaussian Minimum Shift Keying (GMSK) modulation scheme. Although specific exemplary modulation schemes are mentioned herein, it is to be understood that other modulation schemes can be used which map a binary sequence of bits to a plurality of symbols which each represent a plurality of bits. In this exemplary embodiment, the prefix and suffix corresponding to an 8-PSK modulation scheme each comprise a symbol repeated a predefined number of times. For example, in this implementation, the symbol is repeated 4 times and chosen from the 8 possible symbols. The prefix and suffix corresponding to a GMSK modulation scheme in this implementation, comprise a bit value repeated a predefined number of times. In particular, in this implementation, the bit value is logic value 1 and repeated 4 times.

The modulator 228 modulates the encoded data bits received from the channel encoder 226. In particular, as discussed above, the encoded data bits for each time slot comprise a prefix, data from data source 201, and a suffix. The processing functionality 230 of modulator 228 modulates the encoded data bits for each time slot according to the modulation technique selected for that time slot. The modulation technique used changes based, for example, on the type of data being transmitted, the required bandwidth for the data, and the conditions of the communication link 236.

Figure 3A:
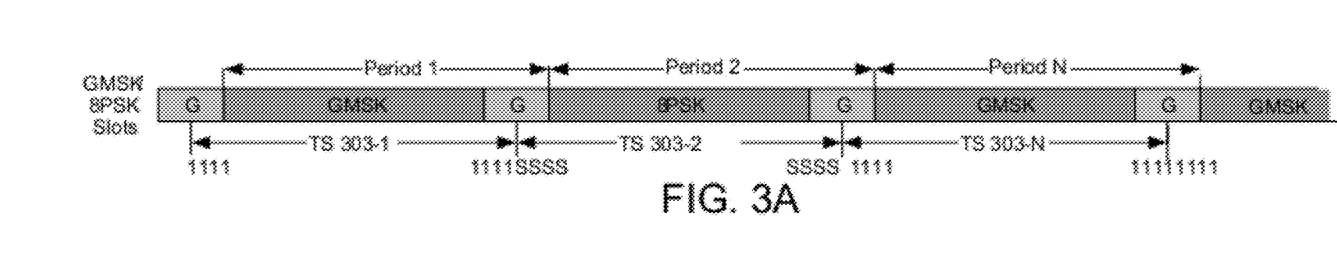
FIGS. 3A and 3B are diagrams depicting one embodiment of exemplary time slots.
Figure 3B:
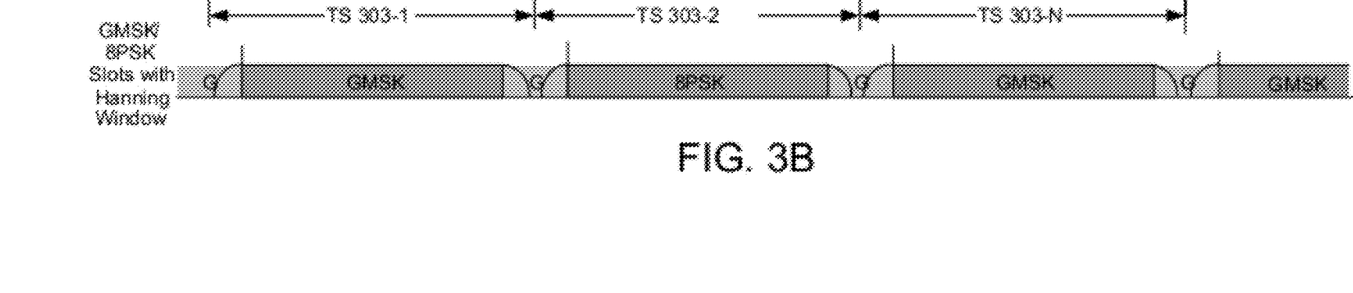

After modulating the encoded data bits, the processing functionality 230 applies a window function to the prefix and suffix of each time slot. The window function is selected such that discontinuities between time slots of different modulation techniques are minimized. For example, due to the inherent $3\pi/8$ rotation involved in the 8-PSK modulation used in this embodiment, modulation of the prefix creates a sine wave of 2708333/5.333~51 kHz at the beginning of the time slot. A similar sine wave is created by modulating the suffix at the end of the time slot. Application of the window function to the sine wave creates a smooth ramp up and ramp down signal as shown in FIG. 3 and described in more detail below. In this implementation a Hanning window function is applied to the constant prefix and suffix of each time slot. However, it is to be understood that other window functions can be used in other embodiments. In addition, in some implementations, the communication link includes a control channel. In some such implementations, the modulator 228 only applies the Hanning window to the prefix and the suffix of consecutive time slots on the control channel when the selected modulation scheme corresponding to the consecutive time slots is different from one time slot to another.

The modulated encoded data bits for each time slot (also referred to hereinafter simply as "time slots" for purposes of explanation) are transmitted to receiver 212 via communication link 236. In particular, the modulated time slots are transmitted such that at least a portion of the prefix and suffix are transmitted during a period when power levels on the communication link 236 are at a minimum level. For example, in this exemplary embodiment, the modulated time slots are transmitted such that at least a portion of the prefix is transmitted during a guard period or band prior to the scheduled start of the time slot. Link 236 comprises any wired or wireless medium suitable for communication signals, such as, but not limited to, fiber optic cable, coaxial cable, twisted pair cable, and wireless radio frequency (RF) communication signals. Hence, modulator 228 is operable to modulate the time slots for transmission over link 236. For example, in this exemplary embodiment, the transmitter 210 further comprises an RF module 234. The RF module 234 receives the modulated time slots produced by the modulator 210 and produces an RF signal suitable for transmission on the link 236. For example, in one implementation where the modulator 210 outputs a digital baseband modulated signal having in-phase (I) and quadrature (Q) components, the RF module 236 performs an up-conversion operation to up-convert the baseband signal to an appropriate RF frequency and performs a digital-to-analog (D/A) operation to produce an analog signal suitable for transmission.

The receiver 212 comprises an RF module 238, a demodulator 240 and a channel decoder 242. The RF module 238 receives the RF signal transmitted on the link 236 and produces a digital baseband signal, comprising the encoded data bits, suitable for use by the demodulator 240. For example, in one implementation where the demodulator 240 is configured to received a digital baseband modulated signal having I and Q components, the RF module 238 performs a down-conversion operation to down-convert the RF signal to baseband and to separate out the I and Q components. The RF module 238, in such an implementation, also performs an analog-to-digital (A/D) operation to produce digitized versions of the baseband signals suitable for use by the demodulator 240.

Demodulator 240 demodulates the modulated data bits and provides the encoded data bits to the channel decoder 242. Channel decoder 242 decodes the demodulated data bits and provides the decoded data bits to a data sink 246, such as, but not limited to, a mobile phone, television system, etc.

Processing functionality 230 in modulator 228 can be implemented using software, firmware, hardware, or any appropriate combination thereof, as known to one of skill in the art. For example, processing functionality 230 can include or interface with hardware components and circuitry that support the demodulation of received symbol sequence y. By way of example and not by way of limitation, these hardware components can include one or more microprocessors, memory elements, digital signal processing (DSP) elements, interface cards, and other standard components known in the art. Any of the foregoing may be supplemented by, or incorporated in, specially-designed application-specific integrated circuits (ASIC) and field programmable gate arrays (FPGA).

In one implementation of the embodiment shown in FIG. 2, at least a portion of the RF module 234, the modulator 228, and/or the channel encoder 226 in receiver 210 are implemented in software that executes on a suitable programmable processor. For example, such a programmable processor can be implemented using a digital signal processor (DSP) that executes software that implements at least a portion of the functionality described herein as being performed by the RF module 234, the modulator 228, and/or the channel encoder 226. Such software comprises a plurality of program instructions tangibly embodied on a processor-readable medium such as modulation and window function instructions 250 stored on memory 232. In other examples, the programmable processor is a part of another type of programmable device such as an ASIC or FPGA. Similarly, in one implementation of the receiver 212 shown in FIG. 2, at least a portion of the RF module 238, the demodulator 240, and/or the channel decoder 242 are implemented in software that executes on a suitable programmable processor.

The memory 232 can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

FIGS. 3A and 3B are diagrams depicting one embodiment of exemplary time slots transmitted over link 236 above. As described above, a time slot includes a prefix, a set number of encoded data bits (148 bits in the exemplary implementation described above) and a suffix. As shown in FIG. 3A, when transmitted, time slots 303-1 . . . 303-N are offset from the scheduled periods 1 . . . N corresponding to the time slots 303-1 . . . 303-N. That is, transmission of a given time slot 303 begins prior to the period scheduled for the corresponding time slot 303. In particular, at least a portion of the prefix is transmitted prior to the start of the corresponding period. For example, as shown in FIG. 3A, the constant bit prefix "1111" corresponding to GMSK time slots and the constant symbol prefix "SSSS" corresponding to 8-PSK time slots are transmitted during a guard band prior to the corresponding period. As shown in FIG. 3B, after applying a Hanning window function to the prefix and suffix, a smooth ramp up and ramp down of each time slot minimizes discontinuities between time slots of different modulation techniques. In deed, in some embodiments, the Hanning window is only applied when the modulation technique of a given time slot is different from the modulation technique of the immediately previous time slot.

Figure 4:
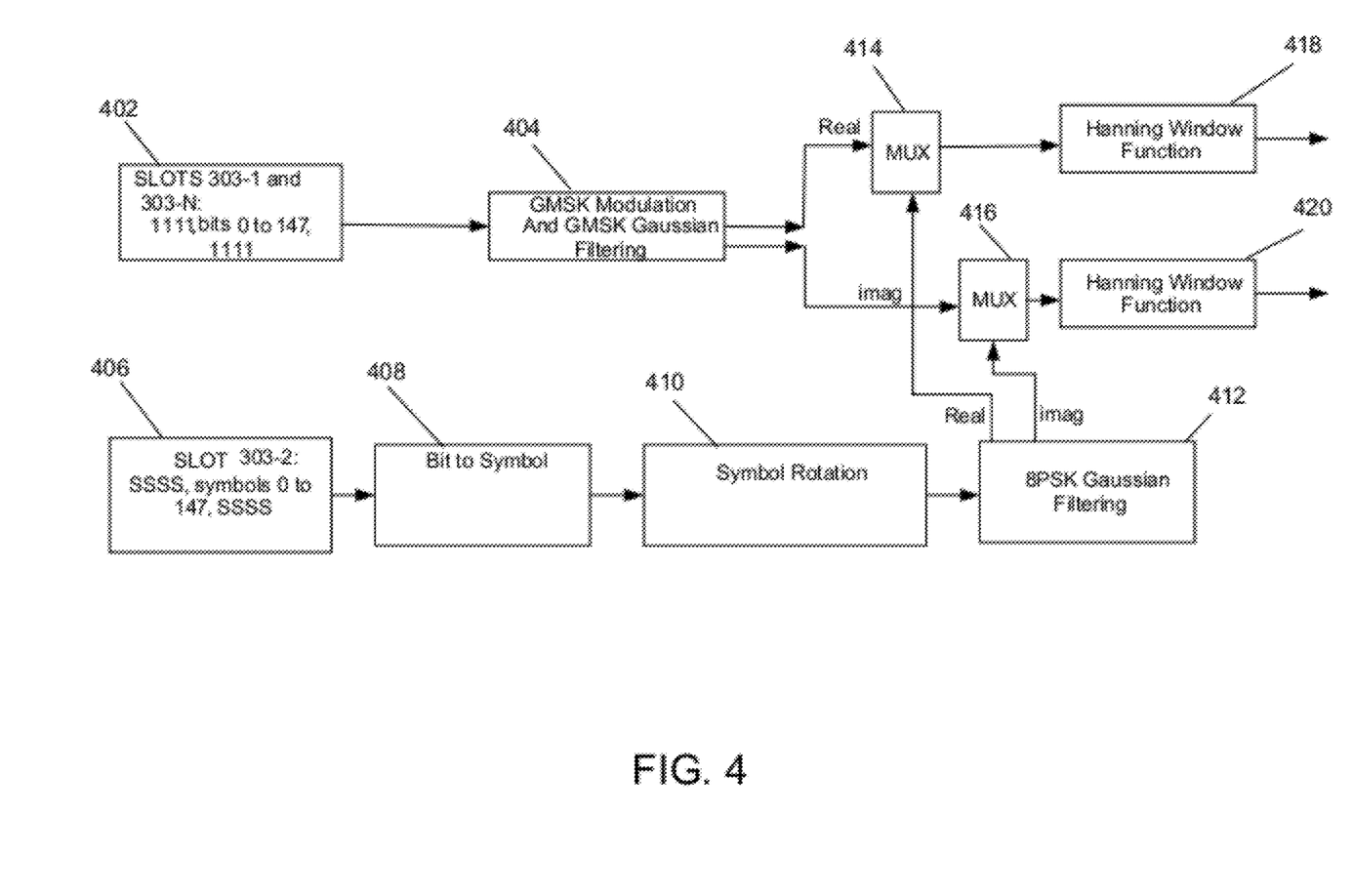
FIG. 4 is a data flow diagram depicting one embodiment of data flow in a modulator.

FIG. 4 is a data flow diagram depicting one embodiment of data flow in modulator 228. time slots 303-1 and 303-N, which correspond to GMSK modulation, enter the modulator 228 at block 402. Time slots 303-1 and 303-N are modulated according to the GMSK modulation scheme at block 404. Similarly, time slot 303-2, which corresponds to 8-PSK modulation, enters the modulator 228 at block 406. At block 408, the data bits in time slot 303-2 are mapped to symbols. At block 410, the symbols in time slot 303-2 are rotated by 3π/8. Then at block 412, a Gaussian filter is applied to the time slot 303-2. At block 414, the real component of the time slots 303-1 and 303-N are multiplexed with the real component of the time slot 303-2. Similarly, at block 416, the imaginary component of time slots 303-1 and 303-N are multiplexed with the imaginary component of the time slot 303-2. In particular, the real and imaginary components are multiplexed such that at least a portion of the prefix of each time slot is occurs prior to the scheduled transmission period of the corresponding time slot. At block 418, a Hanning window is applied to the real components and at block 410 a Hanning window is applied to the imaginary components. The real and imaginary components are then output to the RF module for transmission on link 236.

Figure 5:
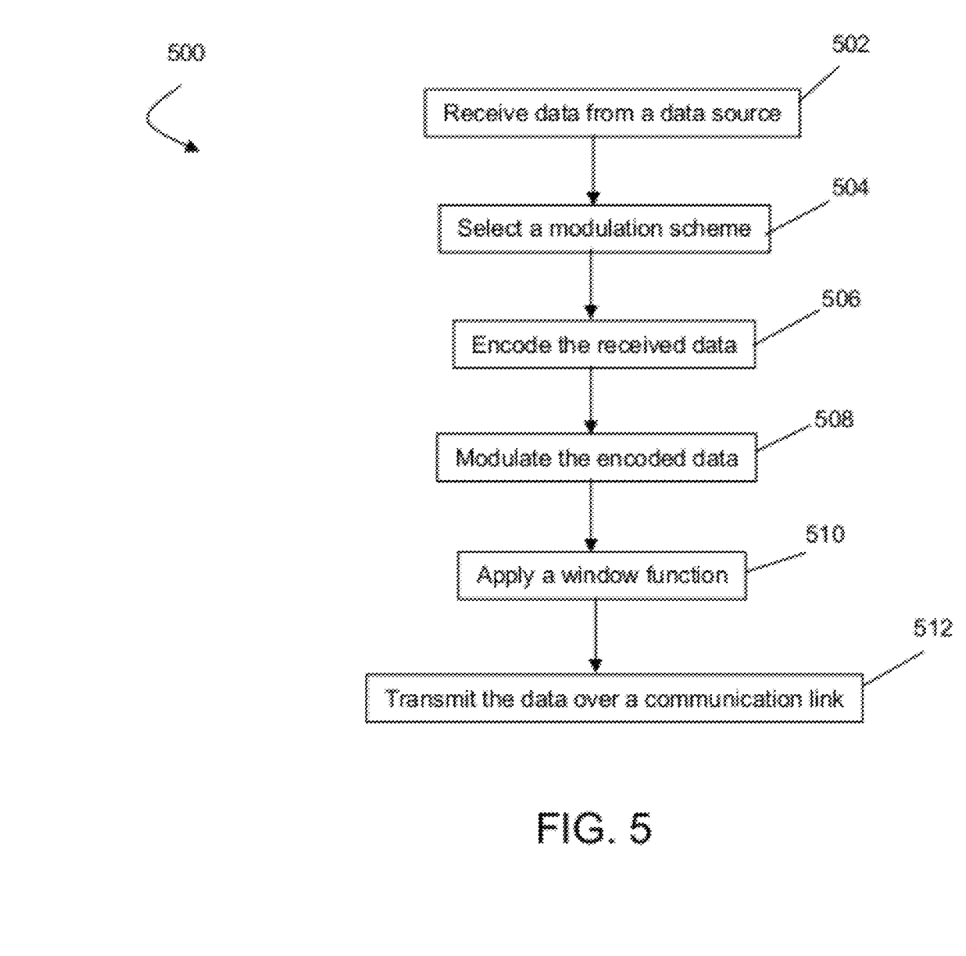
FIG. 5 is a flow chart depicting one embodiment of a method of communicating data.

FIG. 5 is a flow chart depicting a method 500 of communicating data. At block 502, the data to be communicated is received from a data source. For example, voice data from a microphone, video data from a camera, etc. is received by a transmitter in a device such as one of wireless devices 106. At block 504, a modulation scheme is selected for each time slot in which the received data is to be transmitted. For example, the modulation scheme may be selected based on various factors, such as the conditions of the communication link over which the data is to be transmitted, etc., as described above.

At block 506, the received data is encoded. Encoding the data includes pre-pending the data with a prefix and appending the data with a suffix. As described above, the prefix and suffix for a given time slot are chosen based on the selected modulation scheme for the respective time slot. At block 508, for each time slot, the encoded data with the prefix and suffix is modulated according to the selected modulation technique. For example, the modulation techniques to be selected from in this example include, but are not limited to, 8-PSK and GMSK. At block 510, a window function, such as a Hanning window is applied to the prefix and suffix. At block 512, each time slot is transmitted such that at least a portion of the prefix is transmitted when power levels on the communication link are at a minimum level. For example, in one embodiment, at least a portion of the prefix is transmitted during a guard band immediately prior to the scheduled transmission time of the respective time slot.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A transmitter configured to transmit modulated signals over a communication link, the transmitter comprising:
  a channel encoder configured to encode data bits to create encoded data bits;
  a modulator configured to modulate the encoded data bits, wherein the modulator selects as a selected modulation scheme one of a first modulation scheme or a second modulation scheme for each respective time slot of a plurality of time slots;
  wherein, for each respective time slot, the channel encoder:
    includes a prefix and a suffix at a beginning and an end, respectively, of the encoded data bits corresponding to the respective time slot, the prefix and the suffix being selected based on the selected modulation scheme for the respective time slot; and
    passes the prefix, the encoded data bits, and the suffix to the modulator;
  wherein, for each respective time slot, the modulator:
    modulates the prefix, the encoded data bits, and the suffix received from the channel encoder according to the selected modulation scheme for the respective time slot; and
  wherein, for consecutive time slots of the plurality of time slots, the modulator: applies a window function to the prefix and the suffix of the consecutive time slots when the selected modulation scheme differs between the consecutive time slots, the window function being configured to smoothly ramp up the prefix and smoothly ramp down the suffix of the consecutive time slots to minimize discontinuity between the consecutive time slots.

2. The transmitter of claim 1, wherein the first modulation scheme is Gaussian Minimum-Shift Keying (GMSK) and the second modulation scheme is 8-Phase Shift Keying (8 PSK).

3. The transmitter of claim 2, wherein:
the prefix and the suffix corresponding to the first modulation scheme each comprise a constant bit repeated a predefined number of times; and
the prefix and the suffix corresponding to the second modulation scheme each comprise a constant symbol repeated a predefined number of times.

4. The transmitter of claim 1, wherein the window function comprises a Hanning window function.

5. The transmitter of claim 1, wherein the modulator combines the prefix, the encoded data bits, and the suffix for each of the consecutive time slots such that at least a portion of the prefix corresponding to each of the consecutive time slots is transmitted during a guard band prior to each of the consecutive time slots.

6. The transmitter of claim 1, wherein the modulator combines the prefix, the encoded data bits, and the suffix for each of the consecutive time slots such that at least a portion of the prefix corresponding to each of the consecutive time slots is transmitted during a period when power levels on the communication link are at a minimum level.

7. The transmitter of claim 1, wherein:
the communication link comprises a control channel; and
the modulator applies the window function to the prefix and the suffix of the consecutive time slots only when the selected modulation scheme differs between the consecutive time slots.

8. The transmitter of claim 1, wherein the transmitter further comprises a radio frequency (RF) module that up-converts the prefix, the encoded data bits, and the suffix.

9. A communication system comprising:
at least one wireless communication unit to transmit and receive wireless signals to and from at least one mobile device over a communication link; and
a controller coupled to the at least one wireless communication unit to process the wireless signals;
wherein the at least one wireless communication unit comprises:
a receiver to demodulate received signals and to decode received data bits of the demodulated signals; and
a transmitter (a) to encode transmission data bits of a data source to create encoded data bits and (b) to modulate the encoded data bits for transmission to the at least one mobile device;
wherein the transmitter selects as a selected modulation scheme one of a first modulation scheme or a second modulation scheme for each respective time slot of a plurality of time slots;
wherein, for each respective time slot, the transmitter:
includes a prefix and a suffix at a beginning and an end, respectively, of the encoded data bits corresponding to each respective time slot, the prefix and the suffix being selected based on the selected modulation scheme for each respective time slot; and
modulates the prefix, the encoded data bits, and the suffix according to the selected modulation scheme for each respective time slot; and
wherein, for consecutive time slots of the plurality of time slots, the transmitter:
applies a window function to the prefix and the suffix of the consecutive time slots when the selected modulation scheme differs between the consecutive time slots, the window function being configured to smoothly ramp up the prefix and smoothly ramp down the suffix of the consecutive time slots to minimize discontinuity between the consecutive time slots.

10. The communication system of claim 9, wherein the communication system is a Global System for Mobile communications (GSM) network.

11. The communication system of claim 9, wherein the first modulation scheme is Gaussian Minimum-Shift Keying (GMSK) and the second modulation scheme is 8-Phase Shift Keying (8PSK).

12. The communication system of claim 11, wherein:
the prefix and the suffix corresponding to the first modulation scheme each comprise a constant bit repeated a predefined number of times; and
the prefix and the suffix corresponding to the second modulation scheme each comprise a constant symbol repeated a predefined number of times.

13. The communication system of claim 9, wherein the window function is a Hanning window function.

14. The communication system of claim 9, wherein the transmitter transmits the prefix, the encoded data bits, and the suffix for each of the consecutive time slots such that at least a portion of the prefix corresponding to each of the consecutive time slots is transmitted during a guard band prior to each of the consecutive time slots.

15. The communication system of claim 9, wherein the transmitter transmits the prefix, the encoded data bits, and the suffix for each of the consecutive time slots such that at least a portion of the prefix corresponding to each of the consecutive time slots is transmitted during a period when power levels on the communication link are at a minimum level.

16. The communication system of claim 9, wherein:
the communication link comprises a control channel; and
the transmitter applies the window function to the prefix and the suffix of the consecutive time slots only when the selected modulation scheme differs between the consecutive time slots.

17. A method of communicating data in a system utilizing a plurality of time slots, the method comprising:
selecting as a selected modulation scheme one of a first modulation scheme or a second modulation scheme for each respective time slot of the plurality of time slots;
prepending data corresponding to each respective time slot with a prefix based on the selected modulation scheme for each respective time slot;
appending the data corresponding to each respective time slot with a suffix based on the selected modulation scheme for each respective time slot;
modulating the prefix, the data, and the suffix according to the selected modulation scheme for each respective time slot to create a modulated prefix, modulated data, and a modulated suffix for each respective time slot;
applying a window function to the modulated prefix, the modulated data, and the modulated suffix for consecutive time slots of the plurality of time slots when the selected modulation scheme differs between the consecutive time slots, the window function being configured to smoothly ramp up the modulated prefix and smoothly ramp down the modulated suffix of the consecutive time slots to minimize discontinuity between the consecutive time slots; and
after applying the window function, transmitting the modulated prefix, the modulated data, and the modulated suffix of each respective time slot over a communication link such that at least a portion of the modulated prefix of each respective time slot is transmitted when power levels on the communication link are at a minimum level.

18. The method of claim 17, wherein:
transmitting the modulated prefix, the modulated data, and the modulated suffix of each respective time slot comprises transmitting the modulated prefix, the modulated data, and the modulated suffix of each respective time slot during a guard band prior to the each respective time slot.

19. The method of claim 17, wherein:
applying the window function to the modulated prefix, the modulated data, and the modulated suffix for the consecutive time slots comprises applying a Hanning window function to the modulated prefix, the modulated data, and the modulated suffix.

20. The method of claim 17, wherein:
the prefix and the suffix corresponding to the first modulation scheme each comprise a constant bit repeated a predefined number of times; and
the prefix and the suffix corresponding to the second modulation scheme each comprise a constant symbol repeated a predefined number of times.

21. The method of claim 17, wherein:
selecting as the selected modulation scheme one of the first modulation scheme or the second modulation scheme comprises selecting as the selected modulation scheme one of a Gaussian Minimum-Shift Keying (GMSK) or a 8-Phase Shift Keying (8-PSK) for each respective time slot of the plurality of time slots, the first modulation scheme comprising the Gaussian Minimum-Shift Keying (GMSK) and the second modulation scheme comprising the 8-Phase Shift Keying (8-PSK).

22. A method of communicating data in a system utilizing a plurality of time slots, the method being implemented via execution of computer instructions configured to run at one or more processors and configured to be stored at one or more non-transitory memory elements, the method comprising:
executing one or more first computer instructions configured to select as a selected modulation scheme one of a first modulation scheme or a second modulation scheme for each respective time slot of the plurality of time slots;
executing one or more second computer instructions configured to prepend data corresponding to each respective time slot with a prefix based on the selected modulation scheme for each respective time slot;
executing one or more third computer instructions configured to append the data corresponding to each respective time slot with a suffix based on the selected modulation scheme for each respective time slot;
executing one or more fourth computer instructions configured to modulate the prefix, the data, and the suffix according to the selected modulation scheme for each respective time slot to create a modulated prefix, modulated data, and a modulated suffix for each respective time slot;
executing one or more fifth computer instructions configured to apply a window function to the modulated prefix, the modulated data, and the modulated suffix for consecutive time slots of the plurality of time slots when the selected modulation scheme differs between the consecutive time slots each time slot, the window function being configured to smoothly ramp up the modulated prefix and smoothly ramp down the modulated suffix of the consecutive time slots to minimize discontinuity between the consecutive time slots; and
after executing the one or more fifth computer instructions, executing one or more sixth computer instructions configured to transmitting the modulated prefix, the modulated data, and the modulated suffix of each respective time slot over a communication link for each respective time slot such that at least a portion of the modulated prefix of each respective time slot is transmitted during a period when power levels on the communication link are at a minimum level;
wherein:
the computer instructions comprise the one or more first, second, third, fourth, fifth, and sixth computer instructions.

23. The method of claim 22, wherein:
executing the one or more sixth computer instructions configured to transmit the modulated prefix, the modulated data, and the modulated suffix of each respective time slot comprises transmitting the modulated prefix, the modulated data, and the modulated suffix of each respective time slot when power levels on the communication link are at a minimum level.

24. The method of claim 22, wherein:
executing the one or more fifth computer instructions configured to apply the window function to the modulated prefix, the modulated data, and the modulated suffix for the consecutive time slots comprises applying a Hanning window function to the modulated prefix, the modulated data, and the modulated suffix.

25. The method of claim 22, wherein:
the prefix and the suffix corresponding to the first modulation scheme each comprise a constant bit repeated a predefined number of times; and
the prefix and the suffix corresponding to the second modulation scheme each comprise a constant symbol repeated a predefined number of times.

26. The method of claim 22, wherein:
executing the one or more first computer instructions configured to select as the selected modulation scheme one of the first modulation scheme or the second modulation scheme comprises selecting as the selected modulation scheme one of a Gaussian Minimum-Shift Keying (GMSK) or a 8-Phase Shift Keying (8-PSK) for each respective time slot of the plurality of time slots, the first modulation scheme comprising the Gaussian Minimum-Shift Keying (GMSK) and the second modulation scheme comprising the 8-Phase Shift Keying (8-PSK).

* * * * *